US008103421B2

(12) United States Patent
Kondo et al.

(10) Patent No.: US 8,103,421 B2
(45) Date of Patent: Jan. 24, 2012

(54) PARKING BRAKE CONTROL DEVICE

(75) Inventors: Kazuma Kondo, Aichi-gun (JP); Takashi Watanabe, Nagoya (JP); Masaki Ninoyu, Obu (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 535 days.

(21) Appl. No.: 12/361,228

(22) Filed: Jan. 28, 2009

(65) Prior Publication Data

US 2009/0204302 A1    Aug. 13, 2009

(30) Foreign Application Priority Data

Feb. 13, 2008   (JP) .................................. 2008-031714

(51) Int. Cl.
*B60T 7/02* (2006.01)
*B60T 7/12* (2006.01)
(52) U.S. Cl. .......................................... 701/70; 303/20
(58) Field of Classification Search ................ 701/1, 70, 701/50; 188/2 D, 156–164; 303/3, 15, 20, 303/89; 903/947
See application file for complete search history.

(56) References Cited

U.S. PATENT DOCUMENTS

| | | | | |
|---|---|---|---|---|
| 4,265,492 A * | 5/1981 | Pollinger | ........................ | 303/14 |
| 4,629,043 A * | 12/1986 | Matsuo et al. | ................ | 477/184 |
| 6,209,689 B1 * | 4/2001 | Bohm | ........................... | 188/156 |
| 6,213,259 B1 * | 4/2001 | Hanson et al. | ................ | 188/156 |
| 6,249,737 B1 | 6/2001 | Zipp | | |
| 6,609,595 B2 * | 8/2003 | Flynn et al. | .................... | 188/156 |
| 6,701,242 B1 * | 3/2004 | Diebold | .......................... | 701/70 |
| 6,702,405 B1 * | 3/2004 | Balz et al. | ..................... | 303/192 |
| 7,407,463 B2 * | 8/2008 | Kinder | .......................... | 477/170 |
| 7,458,649 B2 * | 12/2008 | Jeon | ..................... | 303/89 |
| 7,904,227 B2 * | 3/2011 | Fukasawa | ...................... | 701/70 |
| 2004/0026989 A1 * | 2/2004 | Suzuki et al. | .................. | 303/89 |
| 2006/0212207 A1 * | 9/2006 | Sugano et al. | .................. | 701/93 |
| 2007/0240947 A1 * | 10/2007 | Goss et al. | .................... | 188/158 |
| 2008/0185235 A1 * | 8/2008 | Suzuki | ..................... | 188/1.11 E |

FOREIGN PATENT DOCUMENTS

| | | | |
|---|---|---|---|
| JP | 2001-514597 A | | 9/2001 |
| JP | 2005081964 | * | 3/2005 |
| JP | 2005096543 | * | 4/2005 |
| JP | 2005263025 | * | 9/2005 |

* cited by examiner

*Primary Examiner* — Thomas Black
*Assistant Examiner* — Lindsay M Browder
(74) *Attorney, Agent, or Firm* — Buchanan Ingersoll & Rooney PC

(57) ABSTRACT

When a release control is executed while a service brake is operating, a parking brake control device continues the release control until a first predetermined time passes even if the pressing force for moving a friction material becomes a target value, wherein the first predetermined time is a time period which is longer than a time period which it is supposed to take until the negative influence of the service brake vanishes.

7 Claims, 10 Drawing Sheets

PARKING BRAKE CONTROL DEVICE

CROSS REFERENCE TO RELATED APPLICATION

This application is based on and incorporates herein by reference Japanese patent applications No. 2008-031714 filed on Feb. 13, 2008.

FIELD OF THE INVENTION

The present invention relates to a parking brake control device for executing a lock/release control of an electric parking brake (hereinafter referred to as EPB).

BACKGROUND OF THE INVENTION

Conventionally, a parking brake is used for restricting movement of a parked vehicle. For example, a manual parking brake is used in which an operation force applied to an operation lever is transmitted to a brake mechanism of the parking brake when the operation lever pulls a brake cable caused by the operation force. An electrically driven parking brake is also used in which a rotational force of a motor is transmitted to the brake mechanism of the parking brake.

In the electrically driven parking brake (i.e. EPB), a brake force is generated when, for example, a rotational force of a motor pulls a brake cable and the tension of the brake cable is thereby transmitted to the brake mechanism (i.e. actuator). In a lock control of the EPB, the parking brake control device rotates the motor in a lock side direction (i.e. forward direction) to transmit the rotational force of the motor to the brake mechanism (i.e. actuator) and stops the rotation of the motor with the brake force remained. In a release control, the parking brake control device rotates the motor in a release side direction (i.e. reverse direction) to remove the brake force.

Thus, the lock/release control includes the lock control and the release control. In the lock control, the parking brake control device keeps the EPB locked at a desired force by stopping the rotation of the motor in the lock side direction when the tension applied to the brake cable reaches a target value. In the release control, the parking brake control device detects that the brake force is removed by detecting that the tension of the brake cable becomes approximately zero. See Japanese Patent Application Publication No. 2001-514597 (U.S. Pat. No. 6,249,737).

However, in a built-in brake in which the EPB and a service brake commonly use an actuator, the actuator is under influence of the status of operation of the service brake. In other words, the actuator is under influence of a brake hydraulic pressure. Therefore, there is an occasion in which the brake force is not totally removed even if a tension sensor detects that the tension applied to the brake cable becomes zero. If the release control is terminated in this occasion, the brake force is not removed and therefore "brake force dragging" occurs in which a residual brake force remains even if a drive is not performing parking brake operation.

In the above description, the EPB uses the brake cable to transmit the rotational force of the motor to the brake mechanism. However, the EPB is not restricted to ones which use a brake cable to transmit the rotational force of the motor to the brake mechanism. For example, the EPB may generate a hydraulic pressure by pressing a hydraulic piston with the rotational force of the motor and may press brake pads or brake shoes with the generated hydraulic pressure. The EPB of this type also has a problem similar to that of the EPB using the brake cable. The EPB of this type which does not use a brake cable generates a pressing force for moving a friction material such as a brake pad and a brake shoe by rotating the electrical motor installed to the EPB. Then the pressing force generates the brake force. In this type of EPB, the parking brake control device can detect the pressing force for moving the friction material and terminate the release control when the detected pressing force is decreased to a target value at which the brake force caused by the EPB is supposed to be removed. By executing this type of control, the problem occurs which is similar to one described for the EPB using the brake cable. Even in the case that the EPB uses a brake cable, it is possible to execute the lock/release control based on the pressing force for moving the friction material and not based on the tension applied to the brake cable. In this case, the problem also occurs which is similar to one described for the EPB using the brake cable.

SUMMARY OF THE INVENTION

It is therefore an object of the present invention to provide a parking brake control device used in a situation where an EPB and a service brake commonly use an actuator, wherein the parking brake control device makes it possible to prevent a release control from terminating when negative influence of the service brake causes the brake force of the EPB to remain. In other words, it is an object of the present invention to prevent a residual brake force from remaining.

In an aspect of the present invention, a parking brake control device includes a lock control means for executing a lock control in which the lock control means causes the electric parking brake to generate a brake force by rotating the electric motor to rotate in the first direction so as to move the first friction material toward the second friction material and then stops rotation of the electric motor to maintain the brake force; and a release control means for executing a release control in which the release control means causes the electric parking brake to decrease the brake force by rotating the electric motor in the second direction so as to decrease the pressing force and to move the first friction material apart from the second friction material and then stops rotation of the electric motor after the pressing force decreases to a target value, wherein the target value is a value at which the brake force generated by the electric parking brake is supposed to be removed.

In addition, the release control means includes: an operation determination means for determining whether or not the service brake is operating; and a first delay means for setting a stop timing of stopping the rotation of the electric motor to a timing which is later by a first predetermined time than a target timing at which the pressing force becomes the target value, if the operation determination means determines that the service brake is operating after the pressing force becomes the target value.

Thus, when the release control is executed while the service brake is operating, the parking brake control device continues the release control until the first predetermined time passes even if the pressing force for moving the friction material becomes the target value, wherein the first predetermined time is longer than a time period which it is supposed to take until the negative influence of the service brake vanishes. Therefore, it is possible to prevent the residual brake force, wherein the residual brake force is a fraction of the brake force caused by the EPB and remains after the release control.

The release control means may further include: a release detection means for detecting that the service brake stops operating in the release control; and a second delay means for setting the stop timing of stopping the rotation of the electric motor to a timing which is later by a second predetermined time than a timing at which the pressing force becomes the target value, when the release detection means detects that the service brake stops operating.

Thus, the pressing force sometimes becomes the target value when the service brake stops operating in the release control. In this case, the parking brake control device continues the release control until the second predetermined time passes, wherein the second predetermined time is longer than a time period which it is supposed to take until the negative influence of the service brake vanishes. Therefore, it is possible to prevent the residual brake force after the release control.

The release detection means may detect that the service brake stops operating by detecting that a time derivative of a brake hydraulic pressure becomes smaller than a threshold, wherein the brake hydraulic pressure changes depending on a state of operation of the service brake.

In this case, the second predetermined time is not determined when the brake pedal is released slowly. However, since influence of the service brake on the pressing force is small in this case, it is unlikely that a condition for terminating the release control is erroneously satisfied. Therefore, it is unnecessary to continue the release control until the second predetermined time passes, since the second predetermined time is longer than a time period which it is supposed to take until the negative influence of the service brake vanishes.

The release control means may cause the second delay means to operate in a second manner in preference to causing the first delay means to operate in a first manner when the release detection means detects that the service brake stops operating, wherein in the first manner the first delay means sets the stop timing of stopping the rotation of the electric motor to the timing which is later by the first predetermined time than a timing at which the pressing force becomes the target value, and in the second manner the second delay means sets the stop timing of stopping the rotation of the electric motor to a timing which is later by the second predetermined time than a timing at which the pressing force becomes the target value.

In this case, it is possible to prevent the release control from terminating based on the first predetermined time even if the service brake is released in the middle of the release control, since the first predetermined time is set when the release control is executed while the service brake is operating.

The release control means stops the rotation of the electric motor when a wait time has passed after the pressing force decreases to the target value in the case that the service brake is not operating during the release control. In this case, the first delay means may set the first predetermined time so that the first predetermined time becomes longer than the wait time in the case that the service brake is operating after the pressing force becomes the target value in the release control.

The second delay means may set the second predetermined time so that the second predetermined time becomes longer than the wait time in the case that the release detection means detects that the service brake stops operating in the release control.

BRIEF DESCRIPTION OF THE DRAWINGS

The invention, together with additional objective, features and advantages thereof, will be best understood from the following description, the appended claims and the accompanying drawings. In the drawings:

DETAILED DESCRIPTION OF THE EMBODIMENTS

Figure 1:
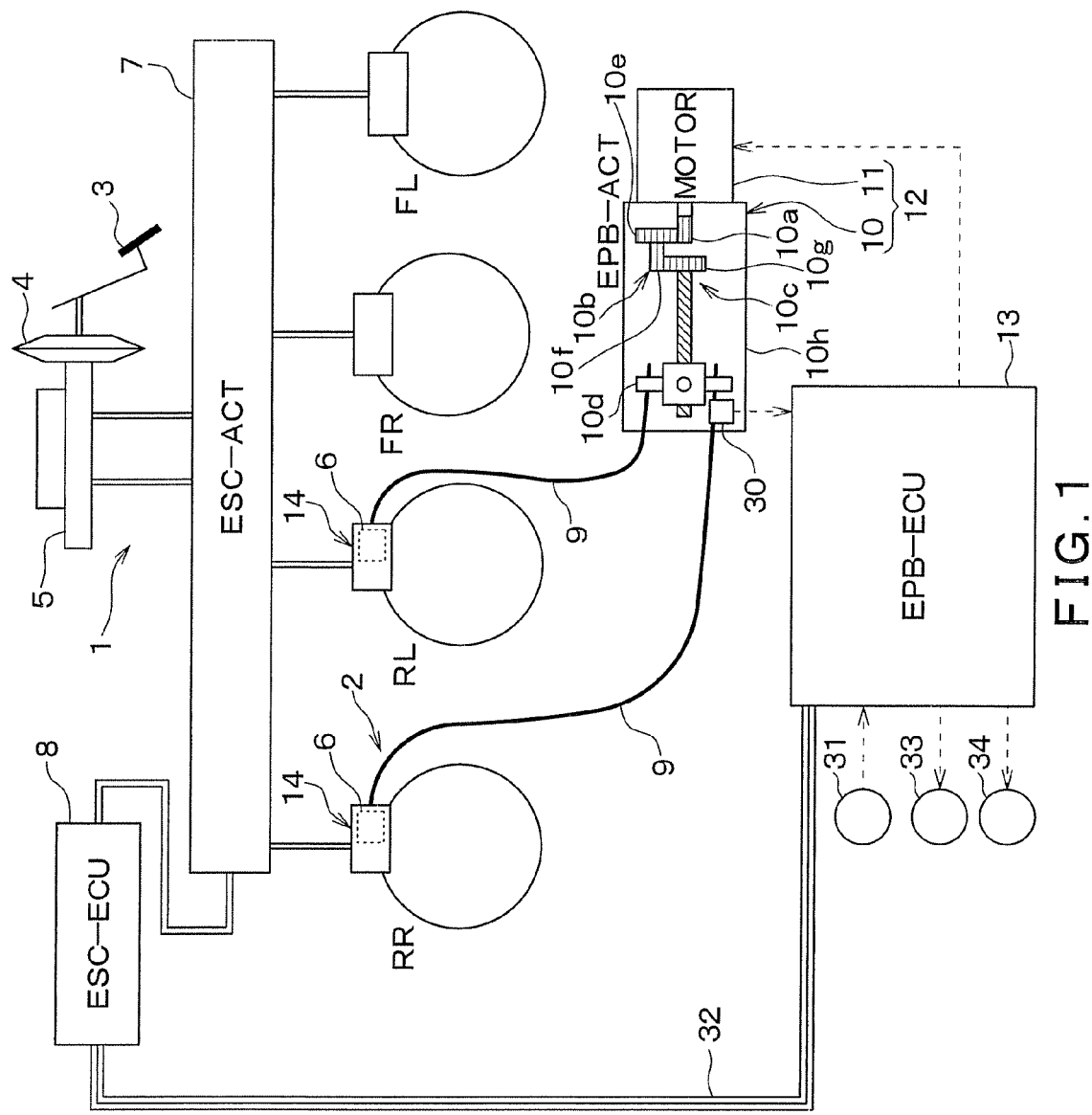
FIG. 1 is a schematic figure showing an overall structure of a vehicular brake system including a parking brake control device according to a first embodiment of the present invention.

Hereinafter, embodiments of the present invention are described with reference to the above figures. Note that elements that are the same or equivalent to each other in the following embodiments are denoted with the same reference numeral in the appended drawings.

First Embodiment

Hereinafter, a first embodiment is described. FIG. 1 is a schematic figure showing an overall structure of a vehicular brake system including a parking brake control device according to the present embodiment.

As shown in FIG. 1, the brake system includes a service brake 1 and an EPB 2. The service brake 1 generates a brake force based on a pedaling force of a driver (i.e., a force applied to a brake pedal by a driver's foot). The EPB 2 is for restricting movement of a vehicle while the vehicle is parked.

In the service brake 1, a brake booster 4 boosts the pedaling force caused by pedaling action of the driver. The service brake 1 generates a brake fluid pressure in a master cylinder 5 based on the boosted pedaling force and transmits the brake fluid pressure to a wheel cylinder (hereinafter referred to as W/C) 6 for each of wheels of the vehicle in order to generate a braking force. An actuator 7 for controlling brake fluid pressure is installed between the master cylinder 5 and each of the W/Cs 6. By using the actuator 7, the service brake 1 can adjust the brake force generated by the service brake 1 and execute various types of control (e.g. anti-skid control) for improving the safety of the vehicle.

More specifically, the various types of control in which the actuator 7 is used is executed by an ESC-ECU 8. For example, the ESC-ECU 8 outputs a control current for controlling various types of control valves (not illustrated) and motors (not illustrated) for driving pumps (not illustrated) in order to control a hydraulic circuit installed to the actuator 7 and accordingly control the W/C pressures transmitted to the W/Cs 6. Thus, the ESC-ECU 8 can prevent the wheels from slipping and accordingly improve the safety of the vehicle. An M/C pressure sensor (not illustrated) for detecting the pressure at the master cylinder 5 is also installed to the actuator 7. A detection signal from the M/C pressure sensor is inputted to the ESC-ECU 8 so that the actuator 7 detects the state of operation of the service brake 1.

On the other hand, the EPB 2 includes an EPB actuator 12 having brake cables 9, a gear mechanism 10, and an electric motor 11, and also includes an EPB control device (hereinafter referred to as an EPB-ECU) 13. The EPB 2 generates a brake force by using the W/Cs 6 which are also used by the service brake 1. Thus, the W/Cs 6 are shared by the EPB 2 and the service brake 1.

Figure 2A:
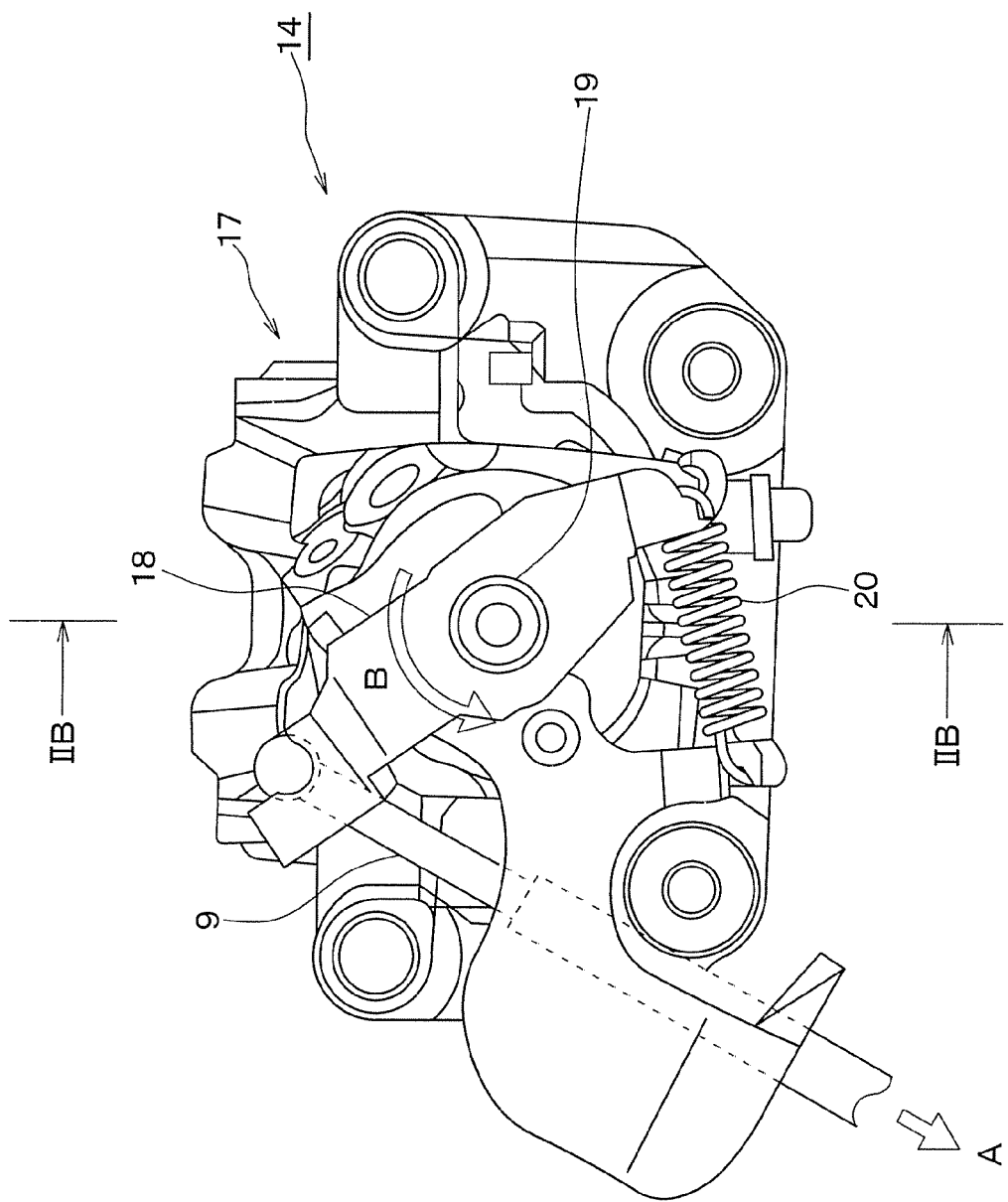
FIG. 2A is a side view showing a built-in brake system.
Figure 2B:
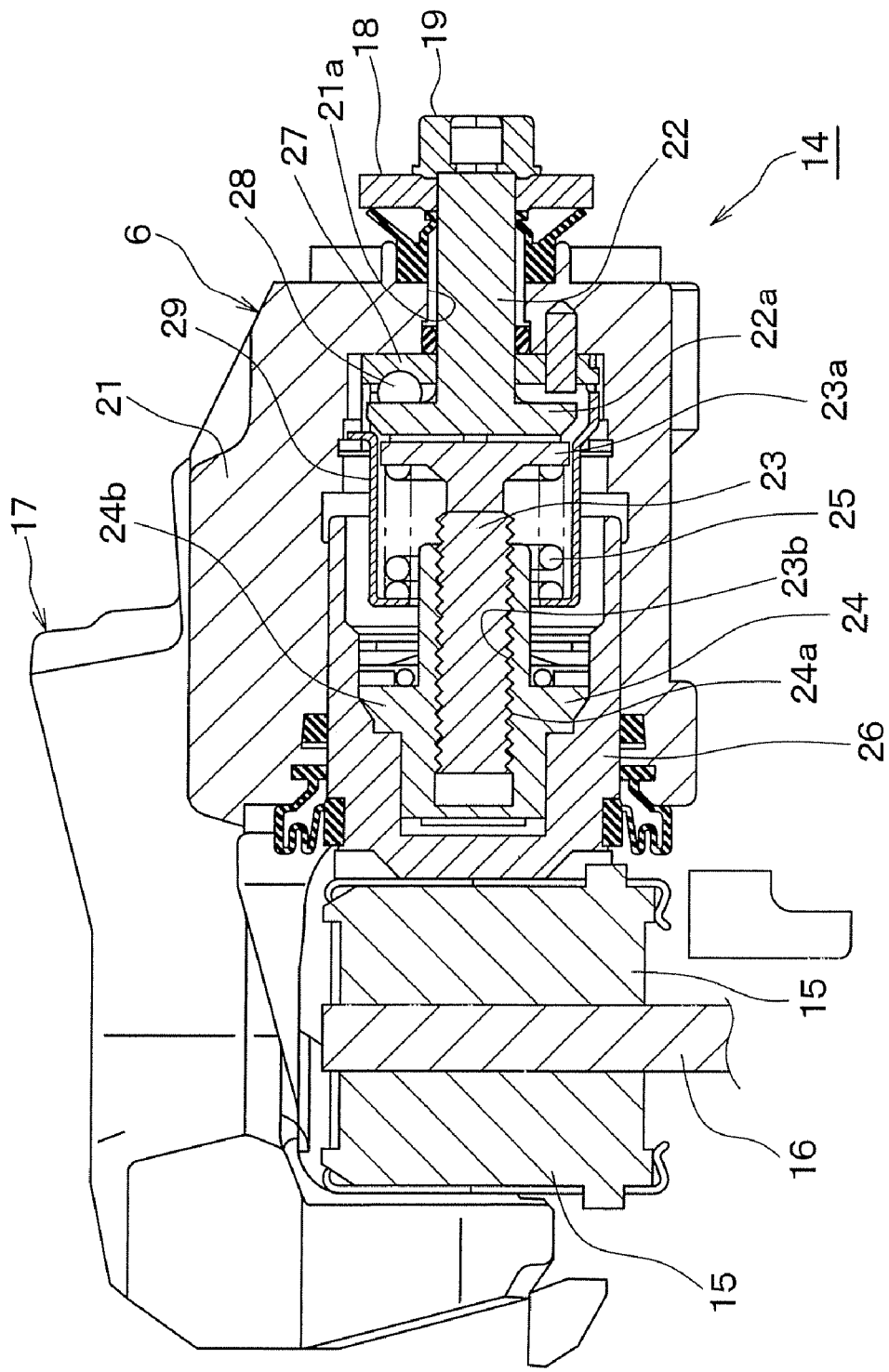
FIG. 2B is a cross-sectional view taken along the IIB-IIB line in FIG. 2A showing a detailed structure of the built-in brake system.

In the present embodiment, a structure in which the service brake 1 and the EPB 2 share the W/Cs 6 for generating the brake force is used as a built-in brake system 14. FIG. 2A is a side view showing the built-in brake system 14. FIG. 2B is a cross-sectional view taken along the IIB-IIB line in FIG. 2A and shows a detailed structure of the built-in brake system 14. Hereinafter, the detailed structure of the built-in brake system 14 is described with reference to FIGS. 2A and 2B.

The built-in brake system 14 presses a brake pad 15 by using one of the W/Cs 6 so that a brake disc 16 is pressed from its both sides by the brake pad 15 not only when the service brake 1 operates but also when the EPB 2 operates. Thus, the built-in brake system 14 generates the brake force as a friction force between the brake pad 15 and the brake disc 16 not only when the service brake 1 operates but also when the EPB 2 operates.

As shown in FIG. 2A, the built-in brake system 14 causes the EPB 2 to generate the brake force by causing the brake cable 9 to pull a caliper lever 18 installed to an end portion of a caliper 17 and generating a hydraulic pressure in the W/C 6 (see FIGS. 1 and 2B) installed in the caliper 17. More specifically, the caliper lever 18 is constructed so that it can rotate around a nut 19. An end of the brake cable 9 is fixed to an end of the caliper lever 18, and a return spring 20 is fixed to the other end of the caliper lever 18. The caliper lever 18 is brought back to its initial position by a spring force (an elastic force) of the return spring 20 when the brake cable 9 is not pulled. The caliper lever 18 is rotated in a direction shown by an arrow B in FIG. 2A against the spring force of the return spring 20 when the brake cable 9 is pulled in the direction shown by an arrow A.

The brake pad 15 is incorporated in the caliper 17 and presses both sides of a portion of an outer part of the brake disc 16. The W/C 6 includes in its cylinder portion 21 a ramp shaft 22, a push rod 23, a nut 24, a return spring 25, and a piston 26.

A portion of the ramp shaft 22 is inserted into an insertion hole 21a located at the cylinder portion 21 and an end of the ramp shaft 22 is thereby connected with the caliper lever 18. The ramp shaft 22 therefore is rotated in accordance with the rotation of the caliper lever 18 when the caliper lever 18 is rotated around a center axis of the nut 19.

A flange portion 22a is formed at another end of the ramp shaft 22 which is opposite to the end of the ramp shaft 22 connected with the caliper lever 18. At a surface of the cylinder portion 21 opposite to the flange portion 22a, a ball bearing portion 27 is formed as a counterpart of the flange portion 22a. A ramp channel (not illustrated) is formed on at least one of a surface (hereinafter referred to as a first surface) of the ball bearing portion 27 and a surface (hereinafter referred to as a second surface) of the flange portion 22a which are opposed to each other. A ball 28 is located on the ramp channel. The ramp channel is a sloping channel the depth of which gradually changes along a circumferential direction around the center axis (i.e. axis of rotation) of the ramp shaft 22. Therefore, when the ramp shaft 22 is rotated along with the caliper lever 18, the flange portion 22a is also rotated and the ramp channel formed on the flange portion 22a and/or the ball bearing portion 27 is rotated relative to one of the first and second surfaces which the ramp channel itself is not on. Accordingly, the ramp of the ramp channel causes the ramp shaft 22 to move along the center axis of the ramp shaft 22.

The push rod 23 is in contact with the end of the ramp shaft 22 where the flange portion 22a is formed. Therefore, when the ramp shaft 22 is moved toward the brake pad 15, a pressing force is applied from the ramp shaft 22 to the push rod 23 and the push rod 23 is moved toward the brake pad 15 along with the ramp shaft 22. The push rod 23 is constructed so that it can get apart from and come in touch with the ramp shaft 22 and can move toward the brake pad 15 apart from the ramp shaft 22 when the service brake 1 operates.

In addition, a flange portion 23a is formed at the end of the push rod 23 closer to the ramp shaft 22, and the spring force of the return spring 25 is applied to the flange portion 23a. The return spring 25 is supported by a spring bearing 29 fixed to the cylinder portion 21. Accordingly, the return spring 25 extends and contracts at the position between the spring bearing 29 and the flange portion 23a of the push rod 23 and applies the spring force to the flange portion 23a to bias the flange portion 23a toward the ramp shaft 22. Therefore, the push rod 23 is biased toward the ramp shaft 22 by the spring force of the return spring 25 when a pressing force toward the brake pad 15 is not applied to the push rod 23.

An external thread 23b is formed on the outer circumstance of the push rod 23 and is screwed into an internal thread 24a which is formed on the internal wall surface of the nut 24. Therefore, when the push rod 23 is moved toward the brake pad 15, the nut 24 is also moved toward the brake pad 15 by a friction force between the external thread 23b formed on the outer circumstance of the push rod 23 and the internal thread 24a formed on the inner wall surface of the nut 24.

Furthermore, a flange portion 24b is formed at the outer circumstance of the nut 24. A part of the nut 24 which is closer to the brake pad 15 than the flange portion 24b is fixed at a hollow portion of the piston 26 by press fitting so that the nut 24 and the piston 26 are combined together as a single body. Therefore, the piston 26 is moved toward the brake pad 15 as the nut 24 is moved toward the brake pad 15. A pressure injection hole (not illustrated) is formed at a position between the flange portion 23a of the push rod 23 and flange portion 24b of the nut 24. Through the pressure injection hole, a hydraulic pressure is transmitted as the W/C pressure when the hydraulic pressure is under control for increasing the M/C pressure (i.e. pressure at the master cylinder 5) or improving the safety of the vehicle. When the W/C pressure is applied to the flange portion 24b, the nut 24 and piston 26 are moved toward the brake pad 15.

As described above, when the service brake 1 of the built-in brake system 14 operates, the W/C pressure is applied to the flange portion 24b of the nut 24 and the piston 26 is accordingly moved to press the brake pad 15. On the other hand, when the EPB 2 of the built-in brake system 14 operates, the brake cable 9 is pulled and the ramp shaft 22 is accordingly used to cause the push rod 23, the nut 24, and the piston 26 to move and press the brake pad 15. Thus, the built-in brake system 14 causes the W/C 6 to press the brake pad 15 when any one of the service brake 1 and EPB 2 operates. Therefore, it is possible to generate the brake force as a friction force which is generated when the brake disc 16 is pressed at its both sides by the brake pad 15. In the present embodiment, the ramp shaft 22 in the built-in brake system 14 serves as an example of a member for generating the pressing force for moving the piston 26 of the W/C 6 in the operation of the EPB 2. The tension of the cable 9 is detected as a force corresponding to this pressing force.

The gear mechanism 10 includes an input gear 10a, a reduction gear 10b, an output shaft 10c, and a drive nut 10d. The input gear 10a is installed to the shaft of the motor 11 and receives the rotational force generated by the motor 11. The reduction gear 10b includes a first spur gear 10e and a second spur gear 10f. The first spur gear 10e is engaged to the input gear 10a. The second spur gear 10f is located coaxially with the rotation axis of the first spur gear 10e and the number of the teeth of the second spur gear 10f is smaller than that of the first spur gear 10e. The output shaft 10c is a drive screw having an external thread. The output shaft 10c has at its one end a third spur gear 10g which is engaged to the second spur gear 10f of the reduction gear 10b. The output shaft 10c is rotated coaxially with the third spur gear 10g when the motor 11 drives the third spur gear 10g by means of the reduction gear 10b. The drive nut 10d moves in a linear direction parallel to the output shaft 10c while being supported by a guide member (not illustrated) mounted in a gear box 10h accommodating the gear mechanism 10. Each brake cable 9 is connected with the drive nut 10d. Therefore, each brake cable 9 is sometimes stretched and is sometimes loosened as the drive nut 10d is moved along the output shaft 10c.

In the gear mechanism 10, rotation of the gears is stopped at the time when the motor 11 is stopped. At this time, the brake cable 9 holds its status under the friction force generated by engagement between the output shaft 10c and the drive nut 10d. Therefore, the brake force is generated in the parking brake mechanism when the rotation of the motor 11 stretches the brake cable 9, and the brake force is maintained when the rotation of the motor 11 is stopped.

The gear mechanism 10 also includes a tension sensor 30 for detecting the tension of the brake cables 9. The tension sensor 30 includes, for example, a spring (not illustrated) which shrinks as the tension of the brake cable 9 gets larger. The tension sensor 30 thus detects the tension of the brake cables 9 by generating a detection signal corresponding to the degree of shrink of the spring. The EPB-ECU 13 detects the tension of the brake cables 9 when the detection signal from the tension sensor 30 is inputted to the EPB-ECU 13.

The EPB-ECU 13 includes a well-known microcomputer having a CPU, a ROM, a RAM, and an I/O and executes a parking brake control by controlling the rotation of the motor 11 according to a program stored in the ROM or the like. The EPB-ECU 13 serves as an example of a parking brake control device of the present invention. For example, the EPB-ECU 13 receives a signal based on an operation state on how an operation switch (hereinafter referred to as SW) 31 is operated, wherein the SW 13 is mounted in the instrument panel (not illustrated) in the passenger's compartment of the vehicle. The EPB-ECU 13 also receives information related to the M/C pressure from the ESC-ECU 8 through an in-vehicle LAN 32. The EPB-ECU 13 then drives the motor 11 based on the operation state of the SW 31 and the M/C pressure. In addition, the EPB-ECU 13 outputs, based on the status of operation of the motor 11, signals indicating whether the operation status is "locking" or "releasing" to a lock/release indicator lamp 33 mounted in the instrument panel. Moreover, the EPB-ECU 13 outputs a signal indicating malfunction of the EPB 2 to a malfunction indicator lamp 34 when the EPB 2 is malfunctioning.

More specifically, the EPB-ECU 13 includes several function sections for executing a lock/release control. For example, the EPB-ECU 13 includes a tension detection section, a target value calculation section, a determination section, a driving section, and an operation determination section. The tension detection section detects, based on the detection signal from the tension sensor 30, the tension applied to the brake cable 9. The target value calculation section calculates a lock control target value TSLT in terminating a lock control. The determination section sometimes determinates whether or not the generated tension reaches a target tension value and sometimes determinates whether or not the generated tension reaches zero. The driving section controls the motor 11 based on the operation status of the SW 31 in order to control the status of operation of the EPB actuator 12. The operation determination section determinates the status of operation of the service brake 1 based on the M/C pressure. The EPB-ECU 13 controls locking and releasing the EPB 2 by rotating the motor 11 in the forward direction and reverse direction and stopping the rotation of the motor 11 based on the operation state of the SW 31 and the tension applied to the brake cable 9. Thus, the brake system according to the present embodiment is constructed.

Figure 3:
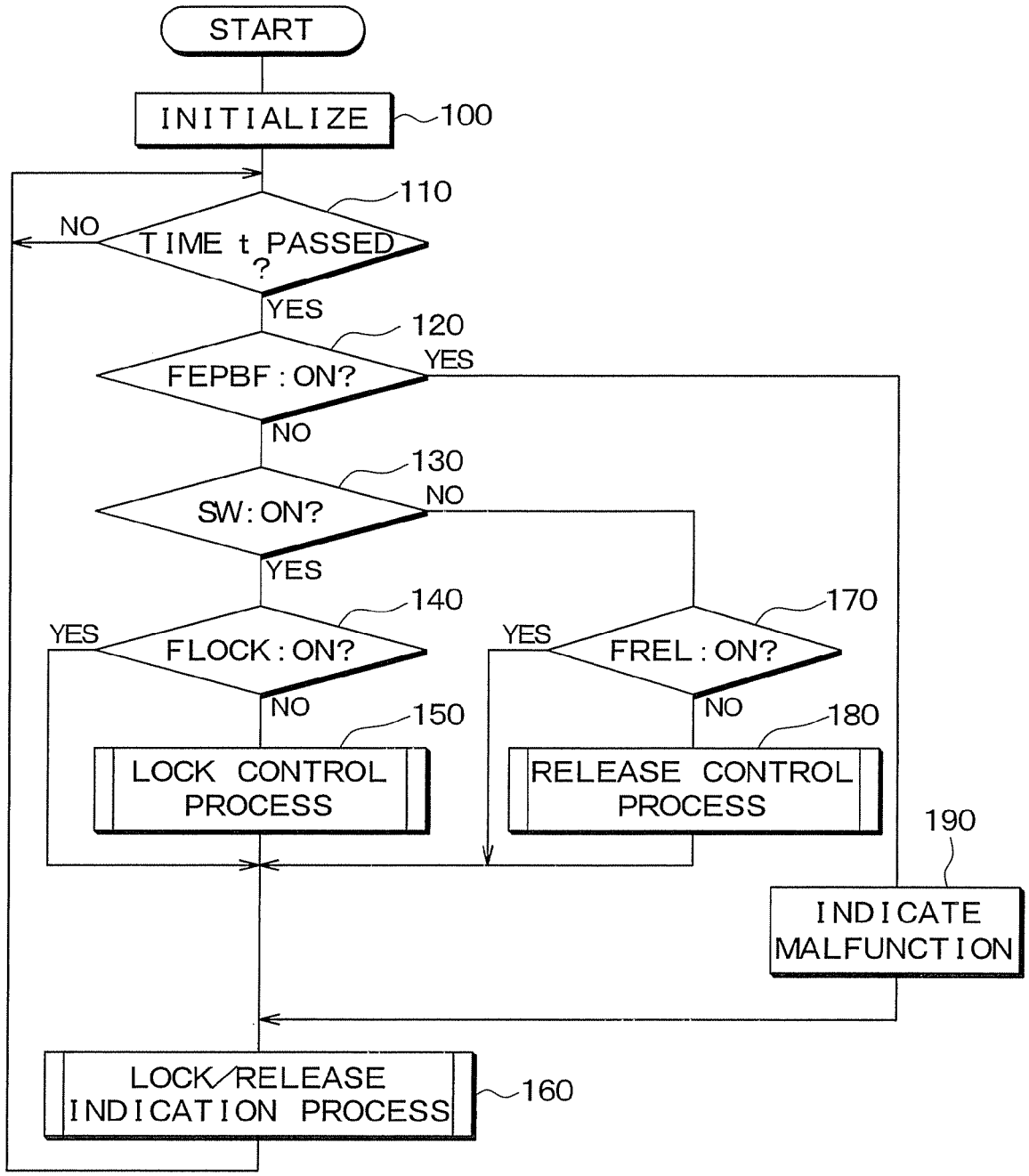
FIG. 3 is a flowchart showing details of a parking brake control.

Next, a parking brake control is described which the EPB-ECU 13 executes according to the several function sections described above and a program stored in the ROM (not illustrated) installed in the EPB-ECU 13. FIG. 3 is a flowchart showing details of the process for the parking brake control.

First, the EPB-ECU 13 executes at step 100 an ordinary initialization process such as resetting time counters for measuring time and flags. Then the EPB-ECU 13 proceeds to step 110 and determines whether or not a time period t has passed. The time period t defines a period between two neighboring control cycles. More specifically, the EPB-ECU 13 repeats the determination process at step 110 until the time period t passes since the initialization process is completed or since the determination at step 110 in the previous control cycle becomes affirmative. Thus, a cycle of the parking brake control is executed every time the time period t passes.

When the determination at step 110 becomes affirmative, the EPB-ECU 13 proceeds to step 120 and executes a failsafe process by determining whether or not an EPB malfunction flag FEPBF is ON. The EPB malfunction flag FEPBF indicates whether or not the EPB 2 is in an extraordinary state. As described later, the EPB malfunction flag FEPBF is turned to ON at step 210 and step 305 when the EPB-ECU 13 is in an abnormal state. If the determination at step 120 is affirmative, the EPB-ECU 13 proceeds to step 190 and turns on the malfunction indicator lamp 34. If the determination at step 120 is negative, the EPB-ECU 13 proceeds to step 130.

At step 130, the EPB-ECU 13 determines whether or not the SW 31 is ON. When the SW 31 is ON, the driver is activating the EPB 2 to put the EPB 2 into the locked state. When the SW 31 is OFF, the driver is putting the EPB 2 to the released state. Therefore, if the determination at step 130 is affirmative, the EPB-ECU 13 proceeds to step 140 to determine whether or not a lock state flag FLOCK is on. The lock state flag FLOCK is a flag which is turned to ON when the EPB 2 is activated and put into the locked state. Therefore, the EPB 2 has finished its operation and a required brake force has been already generated at the time when the lock state flag FLOCK is ON. Accordingly, the EPB-ECU 13 proceeds to step 150 to execute a lock control process only if the determination at step 140 is negative. If the determination at step 140 is affirmative, the EPB-ECU 13 proceeds to step 160 taking that the lock control process to have been completed.

Figure 4:
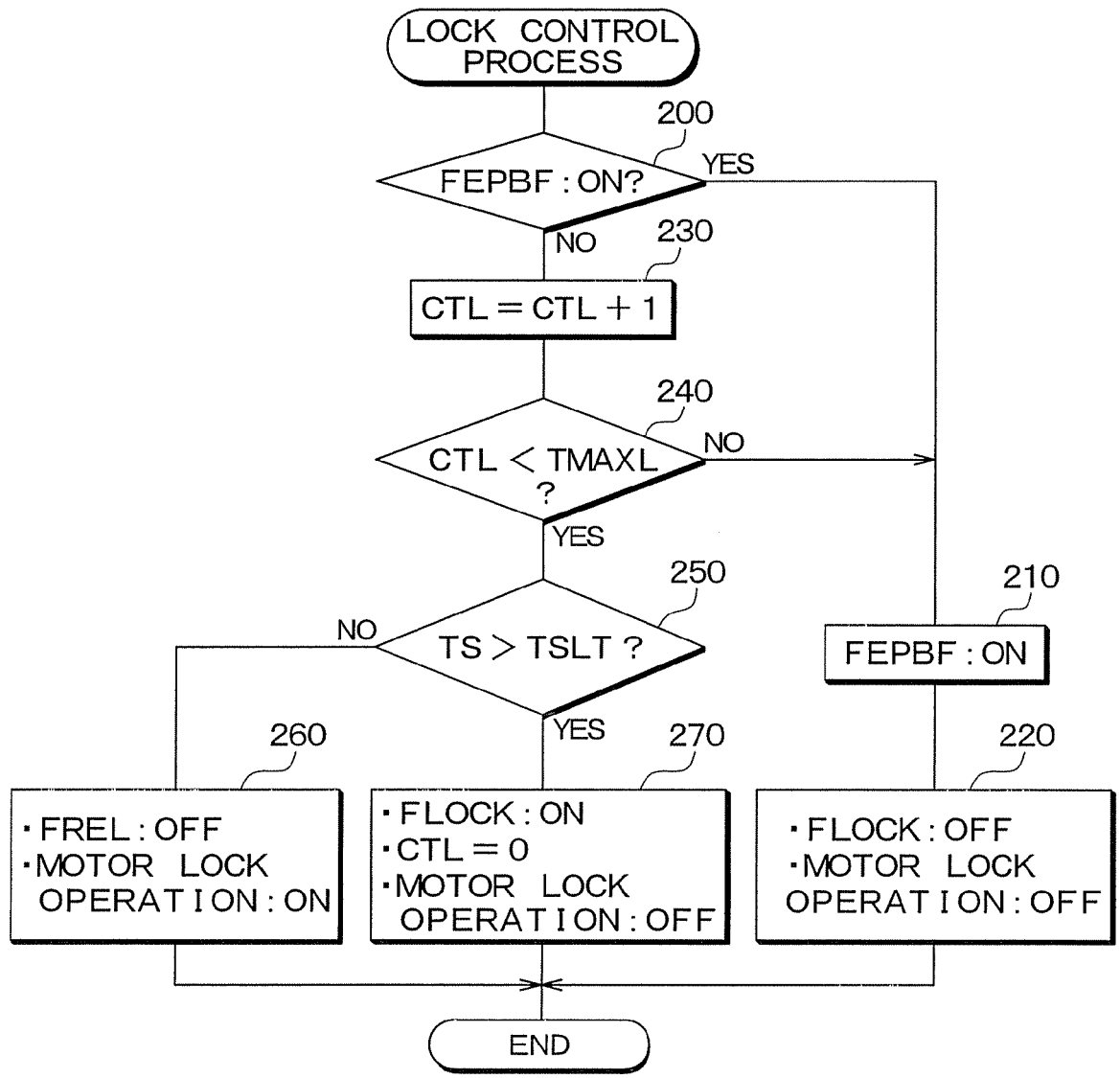
FIG. 4 is a flowchart showing details of a lock control process.

At the lock control process, the EPB-ECU 13 rotates the motor 11 to activate the EPB 2, stops the rotation of the motor 11 when the drive nut 10d reaches a position where a desired brake force is generated, and then keeps the motor stopped. FIG. 4 is a flowchart showing details of the lock control process. Hereinafter, the lock control process is described with reference to FIG. 4.

At step 200, the EPB-ECU 13 determines whether or not the EPB malfunction flag FEPBF is ON. If the determination is affirmative, some kind of malfunction is occurring Therefore, if the determination is affirmative, the EPB-ECU 13 proceeds to step 210 to keep the EPB malfunction flag FEPBF at ON and then proceeds to step 220 to turn the lock state flag FLOCK to OFF and turn motor lock operation to OFF. Turning the motor lock operation to OFF is achieved by not driving the motor 11 or by stopping the motor 11. After step 220, the EPB-ECU 13 terminates the lock control process in the present control cycle.

If the determination at step 200 is negative, the EPB-ECU 13 proceeds to step 230 to increase a lock control time counter CTL by one. Then the EPB-ECU 13 proceeds to step 240 to determine whether the lock control time counter CTL is smaller than a maximum lock control time TMAXL which is predetermined. The maximum lock control time TMAXL is a maximum time to take to execute the lock control and is predetermined based on the length of the brake cable 9, the rotational speed of the motor 11, and the like. It is likely that some kind of malfunction is occurring if the lock control time counter CTL keeps increasing after the maximum lock control time TMAXL passes since the onset of the lock control. For example, this situation occurs when the gear mechanism 10 or the brake cable 9 is damaged and accordingly the tension of the brake cable 9 does not reach a lock control target tension TSLT for a long time. Therefore, if the determination at step 240 is negative, the EPB-ECU 13 proceeds to step 210 to turn the EPB malfunction flag FEPBF to ON and then proceeds to step 220. If the determination at step 240 is affirmative, the EPB-ECU 13 proceeds to step 250.

At step 250, the EPB-ECU 13 determines whether the tension TS is larger than the lock control target tension TSLT, wherein the tension (hereinafter referred to as detected tension value) TS is applied to the brake cable 9 and detected by the tension sensor 30. The lock control target tension TSLT is a value calculated by a target value calculation section of the EPB-ECU 13. The lock control target tension TSLT can be a constant value. Otherwise, the lock control target tension TSLT can be calculated by the target value calculation section by taking into account responsiveness, that is, a time to take to complete the lock control and the release control. For example, the lock control target tension TSLT can be calculated based on a slope angle of a road on which the vehicle is parked.

If the detected tension value TS is smaller than the lock control target tension TSLT, the brake cable 9 is not generating a desired brake force. Therefore, if the determination at step 250 is negative, the EPB-ECU 13 proceeds to step 260 to turn a release state flag FREL to OFF and turn the motor lock operation to ON (i.e. rotate the motor in a forward direction). Accordingly, the gear mechanism 10 is driven by the forward rotation of the motor 11 so that the drive nut 10d moves in the direction parallel to the axis of the output shaft 10c and the brake cable 9 is pulled to lock the EPB 2.

When the detected tension value TS reaches the lock control target tension TSLT, the EPB-ECU 13 proceeds to step 270 taking that the desired brake force is generated by the tension of the brake cable 9—for example, the tension of the brake cable 9 causes the brake pad 15 to press the friction surface of the brake disc 16 with a sufficient force. At step 270, the EPB-ECU 13 turns on the lock state flag FLOCK for indicating that the EPB 2 is completely locked, sets the lock control time counter CTL to zero, and turns motor lock operation to OFF (i.e. stop the motor 11). Accordingly, the motor 11 stops rotating and the operation of the gear mechanism 10 is stopped. At this time, the friction force generated by the engagement between the output shaft 10c and the drive nut 10d keeps the brake cable 9 being pulled. Therefore, the generated brake force is maintained, and the movement of the vehicle is restricted. The lock control process is then completed.

On the other hand, if the determination at step 130 (see FIG. 3) is negative, the EPB-ECU 13 proceeds to step 170 to determine whether or not the release state flag FREL is ON. The release state flag FREL is a flag which is turned to ON when the EPB 2 is activated and is released—that is, when the brake force of the parking brake mechanism is removed. Therefore, the EPB 2 has finished its operation and the brake force has been already removed when the release state flag FREL is ON. Accordingly, the EPB-ECU 13 proceeds to step 180 to execute the release control process only if the determination at step 130 is negative. If the determination at step 170 is affirmative, the EPB-ECU 13 proceeds to step 160 taking that the release control process to have been completed.

In the release control process, the EPB-ECU 13 rotates the motor 11 to activate the EPB 2 and remove the brake force generated at the parking brake mechanism. At this time, the EPB 2 does not suffer from the effect of the service brake 1 and the problem described before does not occur if the service brake 1 is not activated and the release control process is executed by activating only the EPB 2. However, if the service brake 1 is activated at this time, the EPB 2 suffers from the service brake 1. More specifically, the residual brake force would be left if the release control was terminated based only on that the detected tension value TS became zero.

In the built-in brake system 14, the nut 24 is used to move the piston 26 and press the brake pad 15 both in the case that the service brake 1 is activated and in the case that the EPB 2 is activated. When the release control of the EPB 2 is executed while the service brake 1 is operating, the nut 24 and the piston 26 are pressed toward the brake pad 15. Therefore, the force applied from the push rod 23 to the ramp shaft 22 becomes smaller than in the case that the service brake 1 is not operating.

Figure 5:
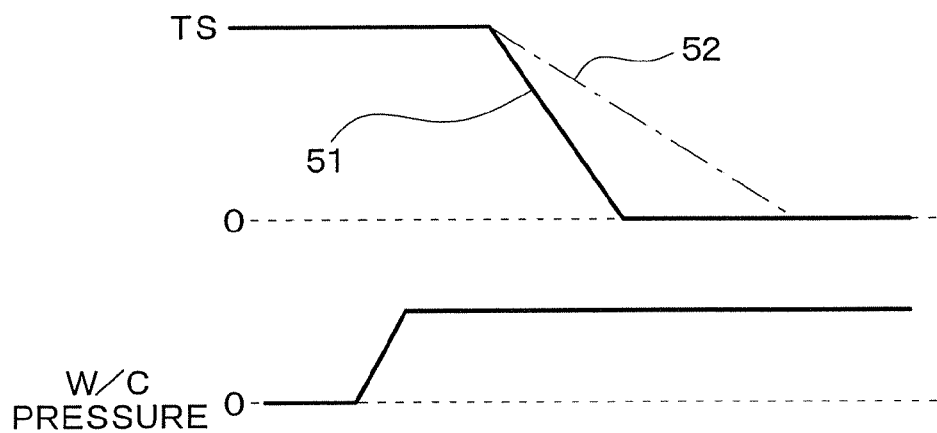
FIG. 5 is a timing chart of showing comparison of a detected tension values TS between the case in which a W/C pressure is applied and the case in which a W/C pressure is not applied.

FIG. 5 is a timing chart showing comparison of detected tension values TS between the case in which the W/C pressure is applied and the case in which the W/C pressure is not applied. The line 51 shows the detected tension value TS in the case that the W/C pressure is applied, and the line 52 shows the detected tension value TS in the case that the W/C pressure is not applied. As is shown in the timing chart, in the case that the service brake 1 is operating and the W/C pressure is applied, the spring in the tension sensor 30 expands more quickly and the detected tension value TS decreases, as shown in the line 51, more quickly and then stops changing, compared to the case that the service brake 1 is not operating and the W/C pressure is not applied. Therefore, when the service brake 1 is operating, the detected tension value TS becoming zero does not always mean that the brake force generated by the EPB 2 is completely removed. Therefore, it is necessary to set criteria for terminating the release control depending on whether or not the service brake 1 is operating.

Figure 6:
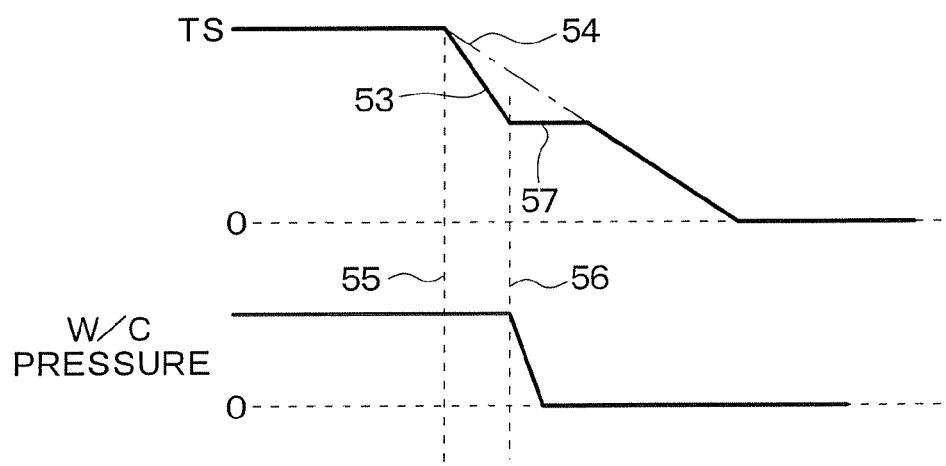
FIG. 6 is a timing chart showing the detected tension values TS in the case that the W/C pressure is released while a release control of the EPB is being executed.

In addition, the service brake 1 may stop operating while the release control is executed. FIG. 6 is a timing chart showing the detected tension values TS 53 in the case that the W/C pressure is released while the release control of the EPB 2 is being executed. The line 54 shows the detected tension value TS as a comparison in which the service brake 1 does not operate during the release control. In this case, the service brake 1 is operating and the W/C is accordingly applied at the onset 55 of the release control. Therefore, the detected tension value TS decreases more quickly than in the case that the service brake 1 is not operating and the W/C pressure is accordingly not applied, as shown by the lines 53 and 54. However, since the service brake 1 stops operating and the W/C pressure is accordingly released at a time instant 56 in the release control, a force is applied from the push rod 23 to the ramp shaft 22 and the spring in the tension sensor 30 temporarily stops expanding and the detected tension value TS accordingly stops changing. Although the service brake 1 is not operating at this time, the residual brake force of the EPB 2 occurs if the EPB-ECU 13 terminates the release control based on that the change rate of the detected tension value TS becomes zero in the time period 57.

Figure 7:
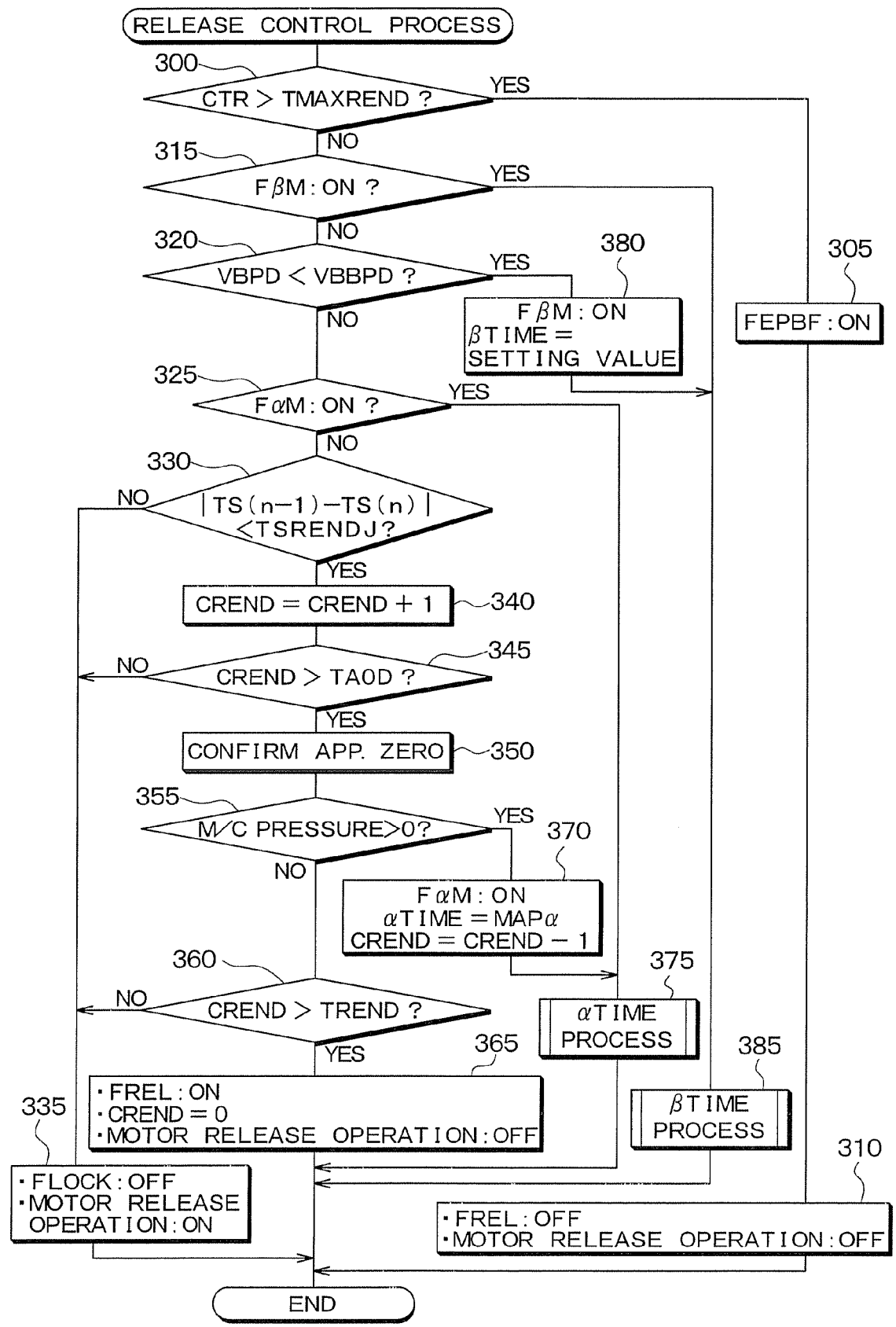
FIG. 7 is a flowchart showing details of a release control.

Therefore, the release control in the present embodiment is executed in the manner as described below. FIG. 7 is a flowchart showing details of the release control. Hereinafter, the release control process is described with reference to FIG. 7.

At step 300, the EPB-ECU 13 determines whether a release control time counter CTR for measuring release operation time is larger than a maximum release control finish time TMAXREND. The release control time counter CTR is a counter for measuring a time period since the release control is started and therefore starts measuring progress of time at the onset of the release control process. The maximum release control finish time TMAXREND is a value which is determined so as to become longer as the amount of pulling of the brake cable 9 performed by the motor 11 becomes longer in the lock control.

Similar to the lock control (see step 210), it is likely that some kind of malfunction is occurring if the release control time counter CTR keeps increasing after the maximum release control finish time TMAXREND passes. Therefore, if the determination at step 300 is affirmative, the EPB-ECU 13 proceeds to step 305 to turn the EPB malfunction flag FEPBF to ON and then proceeds to step 310. At step 310, the EPB-ECU 13 turns the release state flag FREL for indicating whether or not the release control is completed to OFF in order to indicate that the release control is not completed. In addition, the EPB-ECU 13 turns at step 310 the motor release operation to OFF. Thus, the motor 11 stops rotating, and the gear mechanism 10 stops operating.

If the determination at step 300 is negative, the EPB-ECU 13 proceeds to step 315 to determine whether or not a β time memorizing flag FβM is ON. As is described later, the β time memorizing flag FβM is turned to ON at step 380 in setting β time and executing a β time process. The β time and the β time process are described later in detail.

When the determination at step 315 is executed for the first time, the β time memorizing flag FβM is not ON and the EPB-ECU 13 accordingly proceeds to step 320 to determine whether a brake hydraulic pressure derivative VBPD becomes smaller than a threshold VBBPD. The brake hydraulic pressure derivative VBPD is a time derivative of the M/C pressure detected by the M/C pressure sensor. The M/C pressure decreases to zero when the operation of the service brake 1 is terminated. The EPB-ECU 13 detects the fall of the M/C pressure decreasing to zero by means of the brake hydraulic pressure derivative VBPD. More specifically, the EPB-ECU 13 determines that the operation of the service brake 1 is terminated when the brake hydraulic pressure derivative VBPD becomes smaller than the threshold VBBPD.

In the present embodiment, the EPB-ECU 13 determines whether the brake hydraulic pressure derivative VBPD becomes smaller than a threshold VBBPD. In this case, the threshold VBBPD is a negative value. However, termination of the operation of the service brake 1 can be detected by determining whether the absolute value of the brake hydraulic pressure derivative VBPD becomes larger than another threshold VBBPD. In this case, the threshold VBBPD is a positive value.

If the operation of the service brake 1 is not terminated, the EPB-ECU 13 proceeds to step 325 to determine whether or not an α time memorizing flag FαM is ON. As is described later, the α time memorizing flag FαM is turned to ON at step 370 in setting α time and executing an α time process. The α time and the α time process are described later in detail.

When the determination at step 325 is executed for the first time, the α time memorizing flag FαM is not ON and the EPB-ECU 13 accordingly proceeds to step 330 to determine whether or not the detected tension value TS has been kept within a sufficiently small range. The determination at step 330 is executed by determining whether or not the absolute value of a change in the detected tension value TS is smaller than a release control termination determination tension TSRENDJ. The change in the tension TS is calculated by subtracting the detected tension value TS(n−1) at the previous control cycle from the detected tension value TS(n) at the present control cycle.

The detected tension value TS becomes almost constant at zero after the brake force is removed. However, the detected tension value TS changes depending on various factors and therefore can becomes zero caused by noise factors. Therefore, the fact that the detected tension value TS becomes zero is not always sufficient for making a final determination that the brake force is removed. Therefore, in the present embodiment, the absolute value of the change amount of the tension |TS(n−1)−TS(n)| is compared with the release control termination determination tension TSRENDJ. By using the absolute value of the change amount of the tension |TS(n−1)−TS(n)|, the EPB-ECU 13 can determine whether or not the brake force is removed without erroneously determining that the brake force is removed in the case that a noise factor causes the detected tension value TS to become zero. The release control termination determination tension TSRENDJ serves as a tolerance designed for a small fluctuation in the detected tension value TS which occurs caused by various factors even if the detected tension value TS becomes zero and constant not because of the noise factors but because the brake force of the EPB is totally removed.

Thus, in the present embodiment, the EPB-ECU 13 determines whether the pressing force for moving a friction material (the brake pad 15) toward a second friction material (the brake disc 16) becomes a target value. The target value is a value at which the brake force of the EPB 2 is totally removed. In other words, the target value is a zero value of the pressing force which is achieved not because of the noise factors but because the brake force of the EPB 2 is totally removed.

It should be also noted that the release control termination determination tension TSRENDJ is set to be smaller than the absolute value of the time derivative of a detected tension value, wherein the detected tension value TS is detected when a tension is being applied to the brake cable 9 because of the EPB 2. This makes it possible for the EPB-ECU 13 to distinguish a situation where the detected tension value TS becomes practically constant and a tension is not applied to the brake cable 9 from a situation where the detected tension value TS becomes practically constant but the a tension is still applied to the brake cable 9.

The EPB-ECU 13 proceeds to step 335 until the determination of the step 330 becomes affirmative. At step 335, the EPB-ECU 13 turns the lock state flag FLOCK to OFF and turns the motor release operation ON to rotate the motor 11 in the reverse direction. Then, the gear mechanism 10 is driven by the reverse rotation of the motor 11, and the drive nut 10d is accordingly moved along the axis of the output shaft 10c. As a result, the brake cable 9 is brought back to a side in which EPB 2 is released, and the tension applied to the brake cable 9 is accordingly decreased. At the same time, the EPB-ECU 13 increases the release control time counter CTR by one and terminates a cycle of the release control process.

If the determination at step 330 is affirmative, the EPB-ECU 13 proceeds to step 340 to increase a release control termination counter CREND by one. The release control termination counter CREND is a counter for measuring time passed since the change in the tension applied to the brake cable 9 is practically vanished. More specifically, the EPB-ECU 13 starts counting up the release control termination counter CREND as soon as it determines that the absolute value of the change amount of the tension |TS(n−1)−TS(n)| is smaller than the release control termination determination tension TSRENDJ.

Then the EPB-ECU 13 proceeds to step 345 to determine whether the release control termination counter CREND is has exceeded an approximate zero point confirmation time TA0D. The approximate zero point confirmation time TA0D is set to a value corresponding to elapsed time since the change in the tension applied to the brake cable 9 becomes practically zero, wherein the tension applied to the brake cable 9 can be regarded to be truly zero after the elapsed time. The EPB-ECU 13 continues increasing the release control termination counter CREND until the determination at step 345 becomes affirmative. When the determination at step 340 becomes affirmative, the EPB-ECU 13 proceeds to step 350 to execute an approximate zero point confirmation in which EPB-ECU 13 confirms that the tension applied to the brake cable 9 has become zero.

After that, the EPB-ECU 13 determines at step 355 whether or not the M/C pressure is larger than zero, that is, whether or not the M/C pressure is being applied. This determination serves as a determination as to whether or not the service brake 1 is operating. If the determination at step 355 is negative, the EPB-ECU 13 proceeds to step 360 to determine whether or not the release control termination counter CREND is larger than a release control termination time TREND. Thus, the EPB-ECU 13 repeats steps described above until the release control termination counter CREND exceeds the release control termination time TREND. The release control termination time TREND serves as an example of a wait time in the release control in the case that the service brake is not operating. After the release control termination counter CREND exceeds the release control termination time TREND, the EPB-ECU 13 proceeds to step 365 to turn on the release state flag FREL for indicating the release control is completed and to set the release control time counter CTR and the release control termination counter CREND to zero, and to turn the motor release operation to OFF.

Thus, the rotation of the motor 11 and the operation of the gear mechanism 10 stop. At this time, the friction force generated by the engagement between the output shaft 10c and the drive nut 10d keeps the brake cable 9 being loosened.

Thus, the release control process which is executed while the service brake 1 is not operating is completed.

On the other hand, if the determination at step 355 is affirmative, that is, if it is determined that the service brake 1 is operating, the EPB-ECU 13 proceeds to step 370 to turn the α time memorizing flag FαM to ON and determine the α time.

The α time is determined and used to delay the termination of the release control until the negative influence of the W/C pressure vanishes in the case that the release control is executed while the service brake 1 is operating. It should be noted that the α time is expressed by unit of time difference between two neighboring control cycles. Therefore, the α time and the release control termination counter CREND is expressed by the same unit.

If the service brake 1 is operating, the α time is set to a setting value so that a first delay time becomes a first predetermined time which is longer than a time it takes until the negative influence of the W/C vanishes. Here, the first delay time is defined to be the sum of the release control termination time TREND and the α time.

Figure 8:
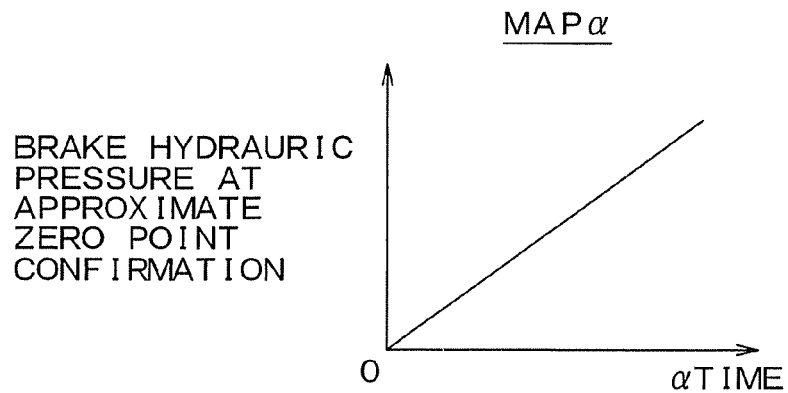
FIG. 8 is a map showing relations between an α time and an M/C pressure, wherein an M/C pressure is a value at the time when it is confirmed that the tension applied to the brake cable has become zero.

If the service brake 1 is not operating, the α time is set to zero. Since it is likely that the service brake 1 is operating at step 370, the α time is set at step 370 to a time period which is longer than a time it takes until the negative influence of the W/C vanishes. For example, the α time is determined based on a map shown in FIG. 8. FIG. 8 is a map showing relations between the α time and an M/C pressure, wherein the M/C pressure is a value at the time of the approximate zero point confirmation. In FIG. 8, the α time becomes larger as the M/C pressure at the time of the approximate zero point confirmation.

In addition, the EPB-ECU 13 decreases the release control termination counter CREND by one. As is described later, the release control termination counter CREND is increased by one again (see step 375a in FIG. 9) in the α time process. Therefore, this process is executed to prevent the release control termination counter CREND from being increased twice within a control cycle.

Figure 9:
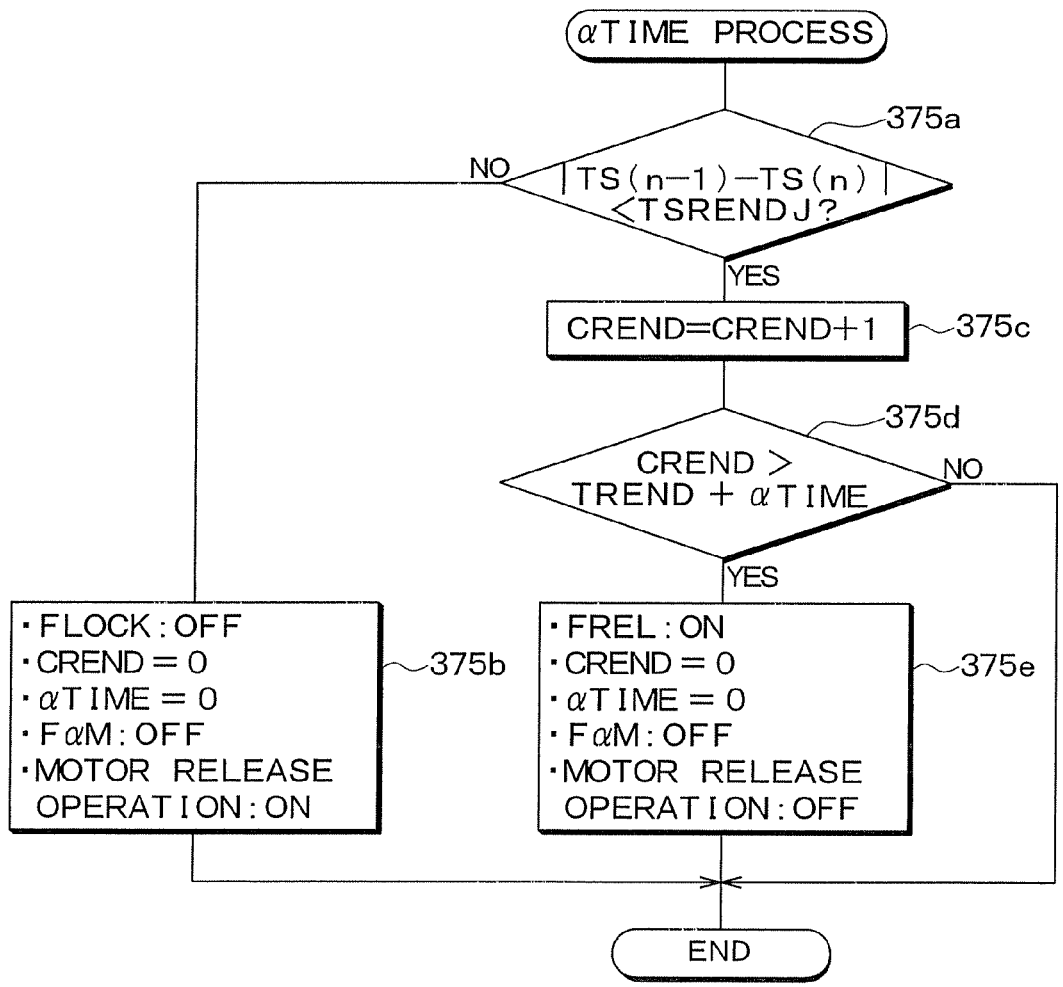
FIG. 9 is a flowchart showing details of an α time process.

Then the EPB-ECU 13 proceeds to step 375 to execute the α time process. FIG. 9 is a flowchart showing the α time process. Hereinafter, the α time process is described with reference to FIG. 9.

When the EPB-ECU 13 executes the α time process, the EPB-ECU 13 determines at step 375a whether or not the absolute value of the change amount of the tension |TS(n−1)−TS(n)| is smaller than the release control termination determination tension TSRENDJ, in the same manner as step 330 in FIG. 7.

If the determination at step 375a is negative, the tension applied to the brake cable 9 is changing and it is therefore necessary to continue the release control. Therefore, if the determination at step 375a is negative, the EPB-ECU 13 proceeds to step 375b to turn lock state flag FLOCK to OFF, set the release control termination counter CREND to zero again, set the α time to zero, turn the α time memorizing flag FαM to OFF, and turn the motor release operation to ON. Then the EPB-ECU 13 increases the release control time counter CTR by one and terminates the release control process in the present control cycle. Thus, the release control is continued.

On the other hand, if the determination at step 375a is affirmative, the EPB-ECU 13 proceeds to step 375c to increase the release control termination counter CREND by one. Then the EPB-ECU 13 proceeds to step 375d to determine whether the release control termination counter CREND has exceeded the sum (i.e. the first delay time) of the release control termination time TREND and the α time. If the determination at step 375 is negative, the EPB-ECU 13 increases the release control time counter CTR by one and terminates the present cycle of the release control process since the negative influence of the W/C pressure does not vanish yet. Thus, the release control is continued.

If the determination at step 375d is affirmative, it is likely that the negative influence of the W/C pressure has vanished. Therefore, if the determination at step 375d is affirmative, the EPB-ECU 13 proceeds to step 375e to turn the release state flag FREL to ON, set the release control termination counter CREND to zero again, set the α time to zero, turn the α time memorizing flag FαM to OFF, and turn the motor release operation to OFF. Then, the EPB-ECU 13 resets the release control time counter CTR to zero and terminates the release control process of the present control cycle. Thus, the release control is completed. As described above, the EPB-ECU 13 completes the release control process in the case that the release control is executed while the service brake 1 is operating.

As is already described, when the brake hydraulic pressure derivative VBPD becomes smaller than the threshold VBBPD and the determination at step 320 in FIG. 7 becomes affirmative, it is likely that the service brake 1 is released while in the release control. In this case, the EPB-ECU 13 proceeds to step 380 to turn the β time memorizing flag FβM to ON and determine the β time.

The β time is determined and used to delay the termination of the release control until the negative influence of the W/C pressure vanishes in the case that the service brake 1 is operating at the onset of the release control and then is released in the release control. It should be noted that the β time is expressed by unit of a time difference between two neighboring control cycles. Therefore, the β time and the release control termination counter CREND is expressed by the same unit.

If the service brake 1 stops operating and is released, the β time is set to a setting value so that a second delay time becomes a second predetermined time which is equal to or longer than a time it takes until the negative influence of the W/C vanishes. Here, the second delay time is defined to be the sum of the release control termination time TREND and the β time.

If the service brake 1 is operating or the service brake 1 does not operate from the beginning of the release control, the β time is set to zero. Since it is likely that the service brake 1 has stopped operating and has been released at step 380, the β time is set at step 380 to a time period which is longer than a time it takes until the negative influence of the W/C vanishes.

It should be noted that the β time is set to the value describe above only when the brake hydraulic pressure derivative VBPD becomes smaller than the threshold VBBPD. Therefore, the β time is not set to the setting value described above in the case that the brake pedal 3 is released slowly. In this case, it is not necessary to set the β time to the values described above. This is because that he W/C pressure decreases gradually and the negative influence on the detected tension value TS is accordingly small. Therefore, the change in the tension applied to the brake cable 9 does not become zero and it is accordingly unlikely that the condition for terminating the release control is erroneously satisfied.

Figure 10:
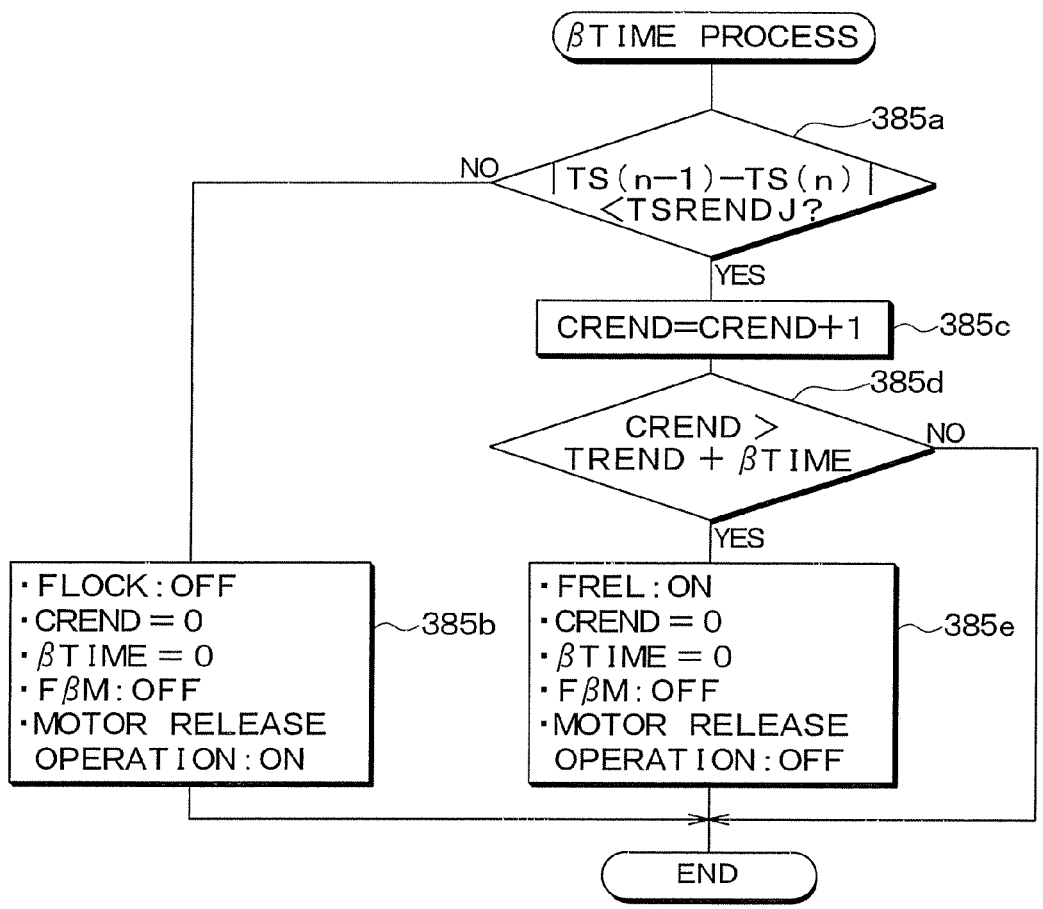
FIG. 10 is a flowchart showing details of a β time process.

Then, the EPB-ECU 13 proceeds to step 385 to execute the β time process. FIG. 10 is a flowchart showing the β time process. Hereinafter the β time process is described with reference to FIG. 10.

When the EPB-ECU 13 executes the β time process, the EPB-ECU 13 determines at step 385a whether or not the absolute value of the change amount of the tension |TS(n−1)−TS(n)| is smaller than the release control termination determination tension TSRENDJ, in the same manner as step 330 in FIG. 7.

If the determination at step 385a is negative, the tension applied to the brake cable 9 is changing and it is therefore necessary to continue the release control. Therefore, if the determination at step 385a is negative, the EPB-ECU 13 proceeds to step 385b to turn lock state flag FLOCK to OFF, set the release control termination counter CREND to zero again, set the β time to zero, turn the β time memorizing flag FβM to OFF, and turn the motor release operation to ON. Then the EPB-ECU 13 increases the release control time counter CTR by one and terminates the release control process in the present control cycle. Thus, the release control is continued.

On the other hand, if the determination at step 385a is affirmative, the EPB-ECU 13 proceeds to step 385c to increase the release control termination counter CREND by one. Then the EPB-ECU 13 proceeds to step 385d to determine whether or not the release control termination counter CREND has exceeded the sum (i.e. the second delay time) of the release control termination time TREND and the β time. If the determination at step 385d is negative, the EPB-ECU 13 increases the release control time counter CTR by one and terminates the release control process in the present control cycle, since the negative influence of the W/C pressure does not vanish yet. Thus, the release control is continued.

If the determination at step 385 is affirmative, it is likely that the negative influence of the W/C pressure has vanished. Therefore, if the determination at step 385d is affirmative, the EPB-ECU 13 proceeds to step 385e to turn the release state flag FREL to ON, set the release control termination counter CREND to zero again, set the β time to zero, turn the β time memorizing flag FβM to OFF, and turn the motor release operation to OFF. Then, the EPB-ECU 13 resets the release control time counter CTR to zero and terminates the release control process in the present control cycle. Thus, the release control is completed. As described above, The EPB-ECU 13 completes the release control process in the case that the service brake 1 stops operating at the onset of the release control and is then released in the release control.

Figure 11:
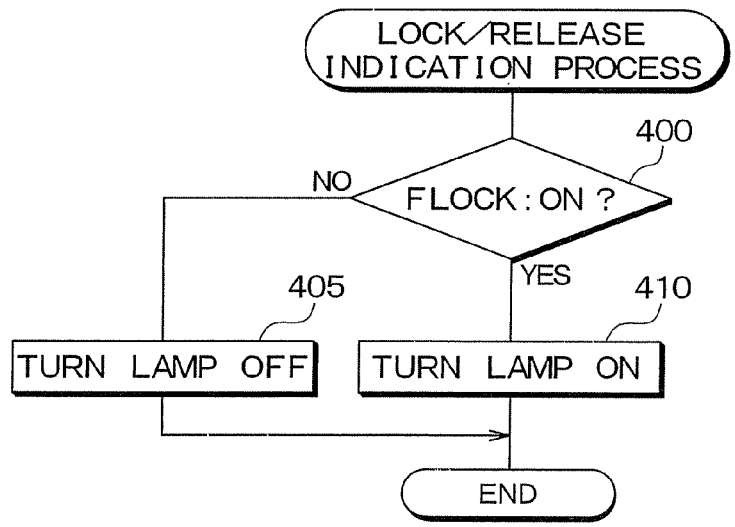
FIG. 11 is a flowchart showing details of a lock/release indication process.

When the lock control process and the release control process are finished as described above, the EPB-ECU 13 executes a lock/release indication process at step 160 in FIG. 3. FIG. 11 is a flowchart showing the lock/release indication process. Hereinafter, the lock/release indication process is described with reference to FIG. 11.

At step 400, the EPB-ECU 13 determines whether or not the lock state flag FLOCK is ON. If the determination is negative, the 13 proceeds to step 405 to turn off the lock/release indicator lamp 33. If the determination is affirmative, the 13 proceeds to step 410 to turn on the lock/release indicator lamp 33. Thus, the EPB-ECU 13 turns on the lock/release indicator lamp 33 if the EPB 2 is in the lock state, and the EPB-ECU 13 turns off the lock/release indicator lamp 33 if the EPB 2 is in the release state or the release control has started. Therefore, it is possible to make the driver recognize whether or not the EPB 2 is in the lock state. Thus, the lock/release indication process is completed and the parking brake control is also completed.

Figure 12:
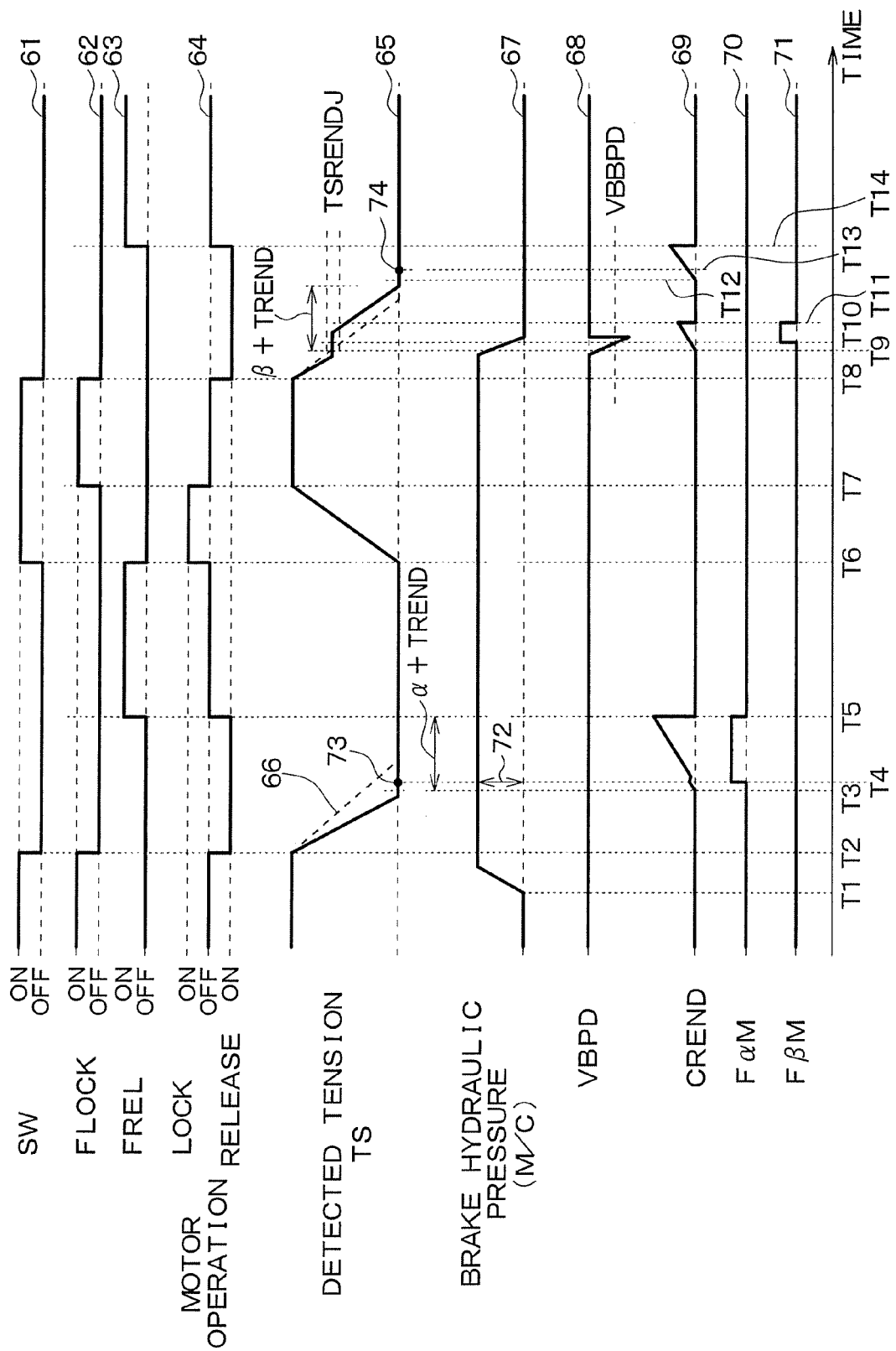
FIG. 12 is a timing chart showing various quantities during the parking brake control.

FIG. 12 is a timing chart showing various quantities during the parking brake control. In FIG. 12, the service brake 1 starts operating at a time instant T1 as shown by a line 67, and the SW 31 is then turned from ON to OFF at a time instant T2 as shown by a line 61. At this time instant T2, the lock state flag FLOCK is also turned from ON to OFF as shown by a line 62 and the motor release operation is turned to ON as shown by a line 64. Electrical current is then supplied to the motor 11 and the tension applied to the brake cable 9 is decreased as shown by a line 65. At this time, the detected tension value TS is decreased more quickly than in the case that the service brake 1 is not operating (see a line 66).

Then at the time instant T3, the release control termination counter CREND starts being counted up as shown by a line 69. When the release control termination counter CREND exceeds the approximate zero point confirmation time TA0D at the time instant T4, the approximate zero point confirmation 73 is executed. The α time is then determined based on the brake hydraulic pressure (i.e. practically the M/C pressure) 72 at the time instant T4. At a time instant T5 at which the first delay time has passed since the time instant T3, it is likely that the negative influence of the W/C pressure has vanished. Therefore at this time instant T5, the release state flag FREL is turned to ON as shown by a line 63 and the release motor operation is turned to OFF as shown by the line 64. In addition, the α time memorizing flag FαM is turned to OFF as shown by a line 70. Thus, the release control is completed.

In FIG. 12, the SW 31 is turned from OFF to ON at a time instant T6. At the same time, the release state flag FREL is turned from ON to OFF and the motor lock operation is turned to ON as shown by the line 64. When the detected tension value TS reaches the lock control target tension TSLT at a time instant T7, the lock state flag FLOCK is turned to ON and the motor lock operation is turned to OFF. Then, the lock control is completed.

In FIG. 12, the SW 31 is turned from ON to OFF at a time instant T8, and the release control is thereby started again. When the service brake 1 stops operating in the middle of this release control, the absolute value of the change amount of the tension |TS(n−1)−TS(n)| becomes smaller than the release control termination determination tension TSRENDJ at a time instant T9 and the release control termination counter CREND is then increased one by one after the time instant T9 as shown in the line 69. However, at a time instant T10, the brake hydraulic pressure derivative VBPD becomes smaller than the threshold VBBPD and the β time is accordingly set to the above described setting value so that the release control is not terminated even if the release control termination counter CREND becomes larger than the release control termination time TREND. At the same time, the β time memorizing flag FαM is turned to ON as shown by a line 71.

When the negative influence of the W/C pressure caused by the service brake 1 vanishes and the detected tension value TS starts changing again at a time instant T11, the release control termination counter CREND is reset to zero. After that, the release control termination counter CREND starts increasing at a time instant T12 when the absolute value of the change amount of the tension |TS(n−1)−TS(n)| becomes smaller than the release control termination determination tension TSRENDJ. After that, the approximate zero point confirmation 74 is executed at a time instant T13 and the release control is terminated at a time instant T14.

A situation may occur which is not shown in FIG. 12. For example, the second delay time may passes in the β time process with the tension almost constant. In this situation, the release control is terminated in the β time process.

As described above, when the release control is executed while the service brake 1 is operating, the EPB-ECU 13 in the present embodiment continues the release control until the first delay time passes after the tension applied to the brake cable 9 becomes zero, wherein the first delay time is longer than a time period which it is supposed to take until the negative influence of the W/C pressure caused by the service brake 1 vanishes. Therefore, it is possible to prevent the residual brake force after the release control, wherein the residual brake force is a fraction of the brake force caused by the EPB 2 and is not removed after the release control.

As also described above, the change in the tension applied to the brake cable 9 sometimes vanish when the service brake 1 stops operating in the release control although the service brake 1 was operating in the release control. In this case, the EPB-ECU 13 continues the release control until the second delay time (second predetermined time) passes, wherein the second delay time is longer than a time period which it is supposed to take until the negative influence of the W/C pressure caused by the service brake 1 vanishes. Therefore, it is possible to prevent the residual brake force caused by the EPB 2 after the release control.

There may be a case in which the service brake 1 starts operating again before the second delay time passes. In this case, the β time memorizing flag FβM is kept at ON and the determination at step 315 accordingly becomes affirmative until the second delay time passes. Therefore, the β time is not set again to the above described setting value until the second delay time passes. Therefore, it is possible to prevent the release control from continuing for exceedingly long time.

Moreover, the determination step 315 for determining whether or not the β time process should be executed is located in an earlier stage in the release control process than the determination step 325 for determining whether or not the α time process should be executed, so that the β time process is executed in preference to the α time process. Therefore, it is possible to prevent the release control from terminating based on the α time even if the service brake 1 is released in the middle of the release control, wherein the α time is determined depending on the M/C pressure at the time when the tension becomes zero.

Other Embodiments (1) In the above embodiment, information related to the M/C pressure is inputted from the ESC-ECU 8 to the EPB-ECU 13. However, another signal by means of which the status of operation of the service brake 1 can be detected may be inputted to the EPB-ECU 13 directly or through the ESC-ECU 8. Such signal may be, for example, a detection signal from a pedaling force sensor for detecting a force applied to the brake pedal by the driver's foot or a detection signal from a stroke sensor for detecting how far the brake pedal is pressed.

(2) In the above embodiment, the α time is changed linearly depending on the M/C pressure. However, the α time may be changed in a stepwise manner. Otherwise, the α time may be a constant value, that is, the α time may be set to the same value irrespective of the M/C pressure while the service brake 1 is operating. Otherwise, the α time may be changed depending on a physical quantity other than the M/C pressure if the status of operation of the service brake 1—i.e. the status of operation of the brake pedal 3—can be detected by means of the physical quantity. Such physical quantity may be, for example, a detection signal from a pedaling force sensor or a detection signal from a stroke sensor, as described above.

(3) In the above embodiment, the EPB 2 is a disk brake. However, the EPB 2 may be a drum brake. In the drum brake, the brake force is generated when a motor operates to adjust the wheel cylinder pressure so that friction surfaces of brake shoes serving as a first friction material (or, a first friction member) is pressed against the inner wall surface of a brake drum serving as a second frictional material (or, second friction member).

In the above embodiment, the brake force is generated when the motor 11 operates to pull the brake cable 9. However, the brake force may be generated by any brake system if the motor 11 generates a pressing force for moving the first friction material (or, the first friction member) in the brake system. For example, a brake system may be used in which the brake force may be generated when the motor 11 operates to press a hydraulic piston so as to increase the hydraulic pressure.

(4) In the above embodiment, when the EPB 2 generates the brake force, the tension applied to the brake cable 9 is used to detect the pressing force for moving the brake pad 15 which serves as a first friction material (first friction member). However, the pressing force is may be detected by using another method. For example, a load which ramp shaft 22 applies to the push rod 23 or a rotation angle of the caliper lever 18 may be used as a quantity corresponding to the pressing force. They can be detected by means of a load sensor or a rotational angle sensor. In the above embodiment, zero tension is used as a target value at which the brake force caused by the EPB 2 is supposed to be removed. However, another value may be used as the target value depending on what quantity is used as a physical quantity corresponding to the pressing force.

(5) Each of the steps shown in the figures serves as a means for executing the corresponding process. For example, a section of the EPB-ECU 13 which executes the lock control process at step 150 serves as a lock control means. A section of the EPB-ECU 13 which executes the release control process at step 180 serves as a release control means. A section of the EPB-ECU 13 which detects that the service brake 1 is released at step 320 serves as a release detection means. A section of the EPB-ECU 13 which determines that the service brake 1 is operating at step 355 serves as an operation determination means. A section of the EPB-ECU 13 which executes the α time process at step 375 serves as a first delay means. A section of the EPB-ECU 13 which executes the β time process at step 385 serves as a second delay means.

What is claimed is:

1. A parking brake control device for executing a parking brake control by using a brake system including an electric parking brake and a service brake, the electric parking brake generating a pressing force for moving a first friction material toward a second friction material by rotating an electric motor in a first direction, the electric parking brake accordingly generating a brake force by using friction between the first friction material and the second friction material, the service brake operating based on operation to a brake pedal and generating a brake force by moving the first friction material to the second friction material, the parking brake control device comprising:
a lock control means for executing a lock control in which the lock control means causes the electric parking brake to generate a brake force by rotating the electric motor to rotate in the first direction so as to move the first friction material toward the second friction material and then stops rotation of the electric motor to maintain the brake force; and
a release control means for executing a release control in which the release control means causes the electric parking brake to decrease the brake force by rotating the electric motor in the second direction so as to decrease the pressing force and to move the first friction material apart from the second friction material and then stops rotation of the electric motor after the pressing force decreases to a target value, wherein the target value is a value at which the brake force generated by the electric parking brake is supposed to be removed,
wherein the release control means includes:
an operation determination means for determining whether or not the service brake is operating; and
a first delay means for setting a stop timing of stopping the rotation of the electric motor to a timing which is later by a first predetermined time than a target timing at which the pressing force becomes the target value, if the operation determination means determines that the service brake is operating after the pressing force becomes the target value.

2. The parking brake control device according to claim 1, wherein the release control means further includes:
a release detection means for detecting that the service brake stops operating in the release control; and
a second delay means for setting the stop timing of stopping the rotation of the electric motor to a timing which is later by a second predetermined time than a timing at which the pressing force becomes the target value, when the release detection means detects that the service brake stops operating.

3. The parking brake control device according to claim 2, wherein the release detection means detects that the service brake stops operating by detecting that a time derivative of a brake hydraulic pressure becomes smaller than a threshold, wherein the brake hydraulic pressure changes depending on a state of operation of the service brake.

4. The parking brake control device according to claim 2, wherein the release control means causes the second delay means to operate in a second manner in preference to causing the first delay means to operate in a first manner when the release detection means detects that the service brake stops operating, wherein in the first manner the first delay means sets the stop timing of stopping the rotation of the electric motor to the timing which is later by the first predetermined time than a timing at which the pressing force becomes the target value, and in the second manner the second delay means sets the stop timing of stopping the rotation of the electric motor to a timing which is later by the second predetermined time than a timing at which the pressing force becomes the target value.

5. The parking brake control device according to claim 3, wherein the release control means causes the second delay means to operate in a second manner in preference to causing the first delay means to operate in a first manner when the release detection means detects that the service brake stops operating, wherein in the first manner the first delay means sets the stop timing of stopping the rotation of the electric motor to the timing which is later by the first predetermined time than a timing at which the pressing force becomes the target value, and in the second manner the second delay means sets the stop timing of stopping the rotation of the electric motor to a timing which is later by the second predetermined time than a timing at which the pressing force becomes the target value.

6. The parking brake control device according to claim 1, wherein:
the release control means stops the rotation of the electric motor when a wait time has passed after the pressing force decreases to the target value in the case that the service brake is not operating during the release control; and
the first delay means sets the first predetermined time so that the first predetermined time becomes longer than the wait time in the case that the service brake is operating after the pressing force becomes the target value in the release control.

7. The parking brake control device according to claim 2, wherein:
the release control means stops the rotation of the electric motor when a wait time has passed after the pressing force decreases to the target value in the case that the service brake is not operating during the release control; and
the second delay means sets the second predetermined time so that the second predetermined time becomes longer than the wait time in the case that the release detection means detects that the service brake stops operating in the release control.

* * * * *